United States Patent
Kobayashi

[11] Patent Number: 6,137,420
[45] Date of Patent: Oct. 24, 2000

[54] SELECTIVE CALL RADIO RECEIVER AND A DATA TRANSMISSION METHOD

[75] Inventor: Yasuhiro Kobayashi, Shizuoka, Japan

[73] Assignee: NEC Corporation, Tokyo, Japan

[21] Appl. No.: 08/966,069

[22] Filed: Nov. 10, 1997

[30] Foreign Application Priority Data

Nov. 8, 1996 [JP] Japan ................................. 8-296135

[51] Int. Cl.⁷ .......................... G05B 19/02; H04Q 19/02; G08B 5/22
[52] U.S. Cl. ................ 340/825.44; 340/825.22; 340/825.27; 340/825.48; 379/384
[58] Field of Search .................. 340/825.48, 825.44, 340/825.22, 825.25, 825.72, 825.26, 825.27; 379/384, 57, 61; 455/38.3

[56] References Cited

U.S. PATENT DOCUMENTS

| | | | |
|---|---|---|---|
| 5,049,874 | 9/1991 | Ishida et al. | 340/825.44 |
| 5,099,507 | 3/1992 | Mukai et al. | 379/57 |
| 5,708,781 | 1/1998 | Chiashi et al. | 395/200.17 |
| 5,877,700 | 3/1999 | Suzuki | 340/825.44 |

FOREIGN PATENT DOCUMENTS

| | | |
|---|---|---|
| 2-44459 | 3/1990 | Japan . |
| 7-50728 | of 1995 | Japan . |
| 7327071 | of 1995 | Japan . |
| 7-327071 | 12/1995 | Japan . |
| 9294284 | of 1997 | Japan . |

*Primary Examiner*—Michael Horabik
*Assistant Examiner*—M. Phan
*Attorney, Agent, or Firm*—Ostrolenk, Faber, Gerb & Soffen, LLP

[57] ABSTRACT

In a selective call radio receiver, having a tone dialer function that can transmit as a tone signal a call number of a recipient accompanied by a message, during the transmission of the tone signal by a tone dialer, a pause signal is automatically inserted between a call signal and the message to temporarily halt the transmission of the tone signal, so that the transmission of the message is ensured. When a message to be transmitted is edited first and then the call number of a recipient is selected, before the transmission of a tone signal the call number is moved to the head of the transmission data, and a pause signal is inserted between the call signal and the message to temporarily halt the transmission of the tone signal, so that the call number of the recipient can be positioned at the head of the transmission data without a complicated operation being required.

8 Claims, 6 Drawing Sheets

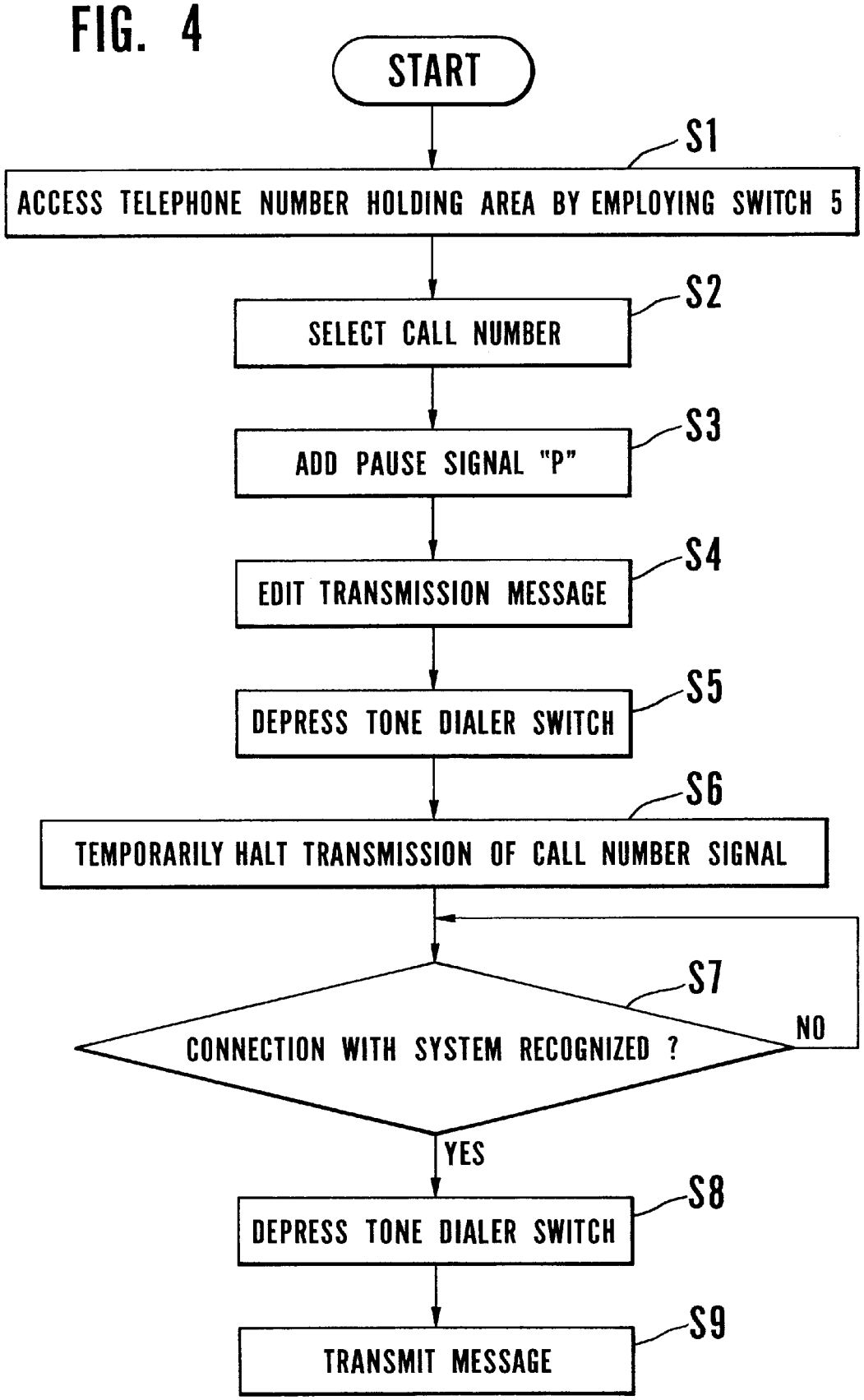

FIG. 6A
SELECTION OF CALL NUMBER
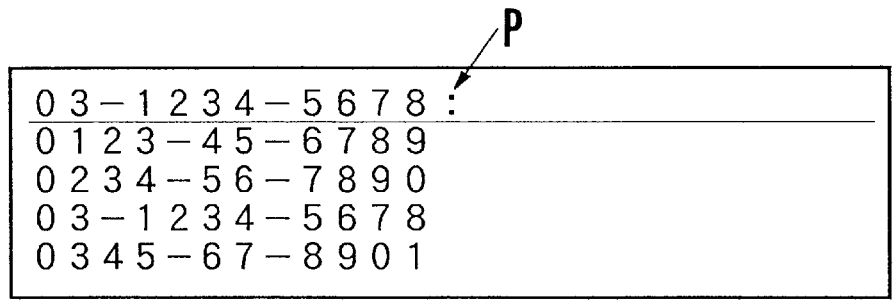
FIG. 6B
PREPARATION OF MESSAGE
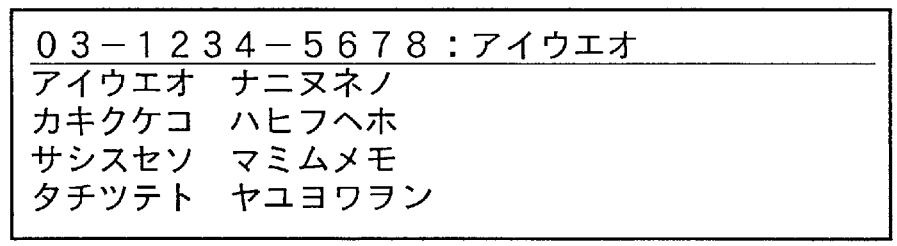
FIG. 6C
TRANSMISSION OF CALL NUMBER SIGNAL
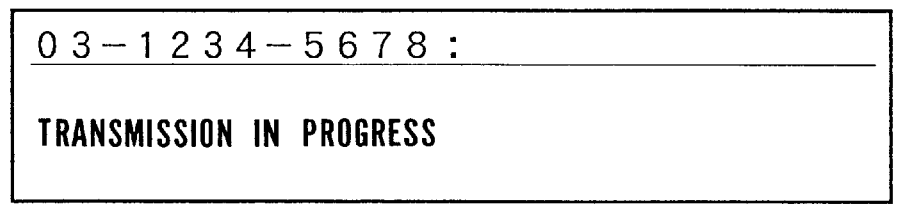
FIG. 6D
TRANSMISSION OF MESSAGE
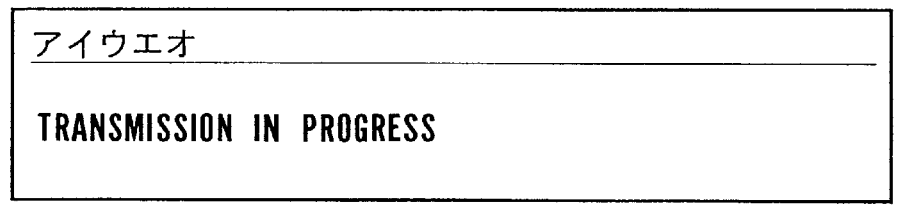

SELECTIVE CALL RADIO RECEIVER AND A DATA TRANSMISSION METHOD

BACKGROUND OF THE INVENTION

1. Field of the Invention

The present invention relates to a selective call radio receiver and a data transmission method, and in particular to a selective call radio receiver having telephone number data stored therein, that has an editing function for such data and a tone signal transmission function, and to a data transmission method.

2. Description of the Prior Art

A currently popular selective call radio receiver known as, a pager, can exchange message information with another pager. To initiate communication between two pagers, the owner of one of the pagers inputs the call number for the other pager by manipulating buttons and then inputs a message to be transmitted. Since such manipulation is troublesome, a selective call radio receiver that is a pager incorporating an auto dialer is well known that has a function for storing a plurality of telephone numbers and for generating dial tones corresponding to stored telephone numbers, and that renders the input of a call number an unnecessary activity by selecting from among stored telephone numbers the telephone number of a call recipient, i.e., the call number of the pager of that recipient, and by automatically generating dial tones corresponding to the selected telephone number.

A conventional selective call radio receiver having an auto dialer has a function for transmitting an internally stored telephone number as one part of a message.

Such a receiver is disclosed in Japanese Unexamined Utility Model Publication No. Hei 2-44459. This receiver can communicate with a selective call radio receiver (a pager) having a message receiving function. When communication is established, the receiver can transmit as message information only a specific telephone number (e.g., the telephone number of the caller) that has been stored in advance, or it can transmit the telephone number in addition to the contents of an actual message. If a specific telephone number can be transmitted as a contact telephone number, the recipient of a call can identify the caller.

The technique disclosed in Japanese Unexamined Patent Publication No. Hei 7-327071 distinguishes between telephone numbers which are stored in a telephone number file in a pager by separating telephone numbers for calling pagers from general telephone numbers, and halts the transmission of a tone dialer signal while calling a pager, or delays its transmission until a message has been input. Therefore, when a telephone number for calling a pager is mistakenly regarded as a general telephone number and is transmitted as a message, its transmission is automatically halted. In addition, when a pager calling number is selected, transmission of a tone dialer signal is halted until a message has been prepared.

However, with a conventional radio call receiver, since a message must be input after the receiver has been connected to a system by a call number, if a message is transmitted before the connection has been completed, the message can not be identified, and the call number of a selective call radio receiver and the message can not be transmitted together as a tone signal.

Furthermore, for a conventional radio call receiver, the call number for a recipient's receiver must be transmitted first to send a message. When a message is edited first and then the call number of the recipient's receiver is selected, the calling number must be positioned in front of the message, and this is a complicated operation.

SUMMARY OF THE INVENTION

It is, therefore, a first object of the present invention to provide a selective call radio receiver that can correctly transmit as a tone signal a call number for a recipient accompanied by a message.

It is a second object of the present invention to provide a selective call radio receiver that, when a message is edited first and then the call number of a recipient is selected, automatically positions the call number of the recipient in front of the data of a message to be transmitted, without requiring the performance of a complicated and troublesome operation.

To achieve the above objects, according to the present invention, a selective call radio receiver comprises:

data holding means for holding data for a telephone number of a receiver of a recipient of a message;

call number selection means for selecting specific telephone number data from among telephone number data stored in the data holding means;

tone dialer means for transmitting as a tone signal the specific telephone number selected as a call number by the call number selection means, accompanied by the message; and control means for, when the tone dialer means transmits a tone signal, halting transmission of a tone signal between the call number and the message.

In addition, a data transmission method performed by a selective call radio receiver that selects a telephone number for a receiver of a recipient of a message from among telephone numbers stored in advance, and transmits as a tone signal the telephone number, selected as a call signal accompanied by a message, comprises the steps of:

when the telephone number for the receiver of the recipient for the message is selected and then the message to be transmitted is edited, inserting a pause signal for preventing transmission of a tone signal between the call signal and the message, before transmission of the tone signal.

Furthermore, according to the present invention, a data transmission method for a selective call radio receiver comprises the steps of:

when the telephone number for the receiver of the recipient of the message is selected and then the message to be transmitted is edited, moving the call number to the head of the data to be transmitted before transmitting the tone signal, and inserting a pause signal for halting transmission of the tone signal between the call number and the message.

As is described above, according to the present invention, since a selective call radio receiver automatically temporarily halts the transmission of a tone dialer signal when the call number for a selective call radio receiver of a recipient and an edited message are to be transmitted together using a tone dialer, by manipulating a single button a caller can connect his or her receiver to the system and transmit the message.

Furthermore, according to the present invention, when a call number is selected after a message is prepared, the call number is so edited that it is always positioned in front of the message, so that the complicated and troublesome manipulation of data can be avoided.

BRIEF DESCRIPTION OF THE DRAWINGS

FIG. 4 is a flowchart of a transmission operation for the selective call radio receiver according to one embodiment of the present invention;

FIGS. 6A to 6D are diagrams showing an example of displays when a message is being transmitted.

DETAILED DESCRIPTION OF THE PREFERRED EMBODIMENTS

Figure 1:
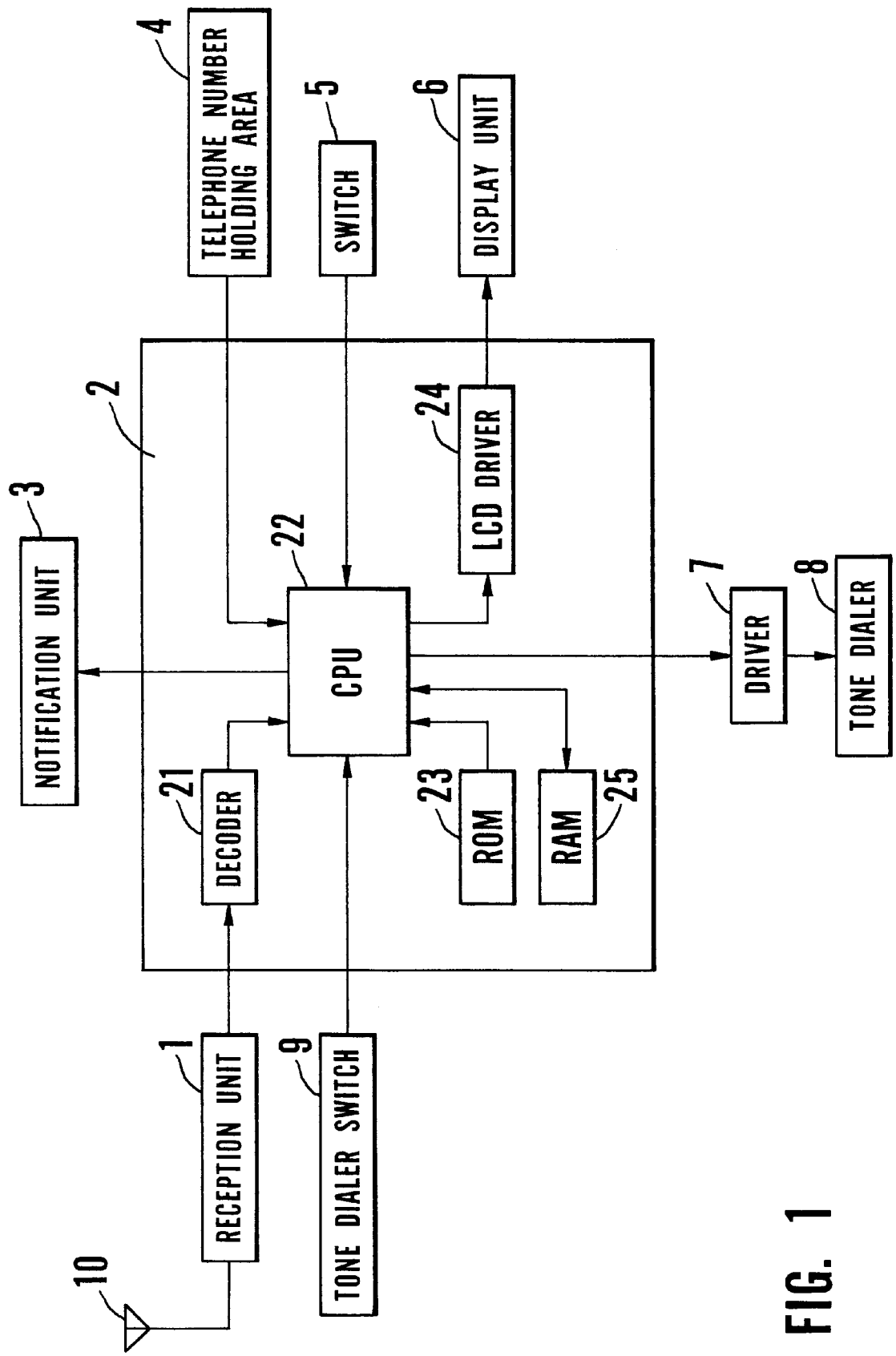
FIG. 1 is a block diagram illustrating the basic structure of a selective call radio receiver according to the present invention.

FIG. 1 is a block diagram illustrating the arrangement of a selective call radio receiver according to one embodiment of the present invention.

In FIG. 1, a reception unit 1 receives data through an antenna 10 and transmits it to a controller 2, which has a notification unit 3 for notifying a user of the reception of a call when an address included in the received data matches address information internally stored therein.

The receiver further comprises a telephone number holding area 4 in which a plurality of telephone numbers are stored; a display unit 6 for, in response to a user's manipulation of a switch 5, calling and displaying a telephone number stored in the telephone number holding area 4, or for displaying an edited message to be transmitted; a tone dialer switch 9 for transmitting a tone signal; and a tone dialer 8 for changing an edited message into signals using a driver 7, and for transmitting the signals to a system.

The controller 2 includes a decoder 21, for determining whether or not an I/O signal from the reception unit 1 matches the call number of the receiver, and for, when the signal matches, transmitting a sequentially received message signal to a CPU 22; the CPU 22, for driving the notification unit 3 by employing a program stored in a ROM 23 and for driving an LCD driver 24; a RAM 25, in which a received message is stored; and the LCD driver 24, for preparing a signal wave by using a signal from the CPU 22 to drive the display unit 6. The controller 2 has a two-chip configuration with a one-chip custom IC (e.g., JT6W17A) or the decoder 21 being externally connected.

Figure 2:
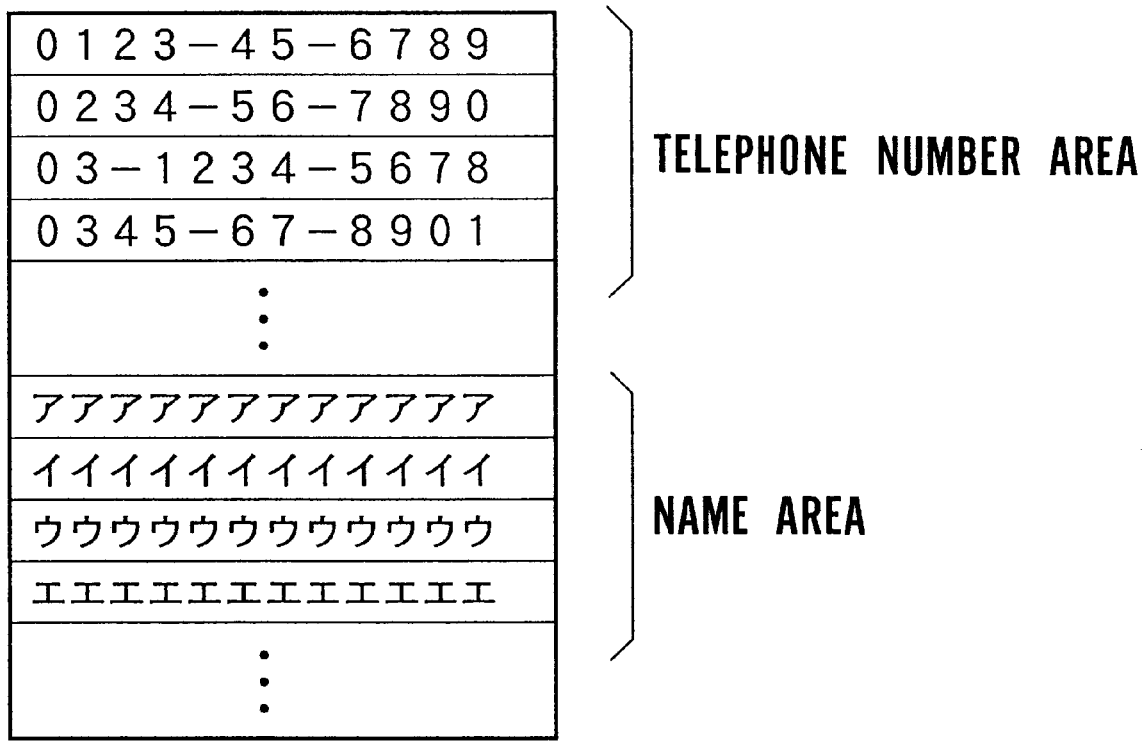
FIG. 2 is a diagram showing the state where telephone number data are stored in a telephone number holding area.

A telephone number table shown in FIG. 2 is stored in the telephone number holding area 4. A telephone number area A and a name area B are provided in which corresponding telephone numbers and names are entered.

Figures 3A, 3B:
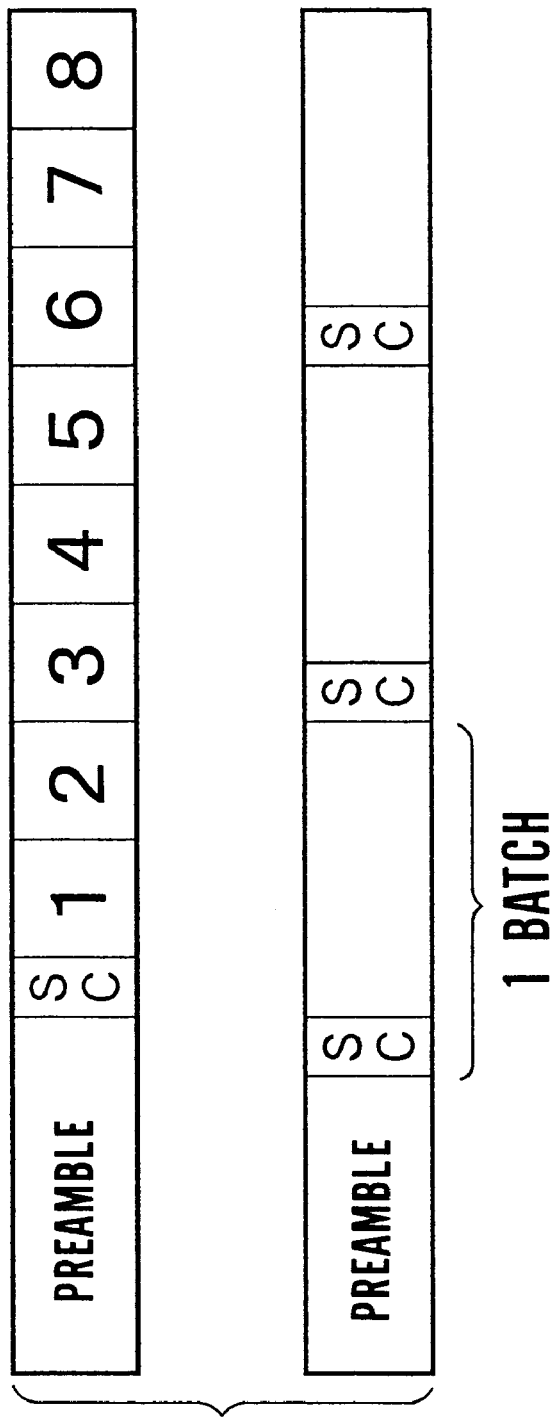
FIG. 3A is a diagram showing a format for a POCSAG signal employed as an example reception signal and FIG. 3B is a diagram showing an example transmission signal (tone dialer signal)

In FIG. 3A is shown a signal format for a signal received by the above arranged selective call radio receiver, and in FIG. 3B is shown a signal format for a transmission signal.

The format for a POCSAG signal employed as an example reception signal will now be explained. In this signal format there is first a preamble which consists of an I/O pattern having 576 bits or more, then a sync signal SC which consists of a predetermined 32-bit data string, and finally frames 1 through 8, in each of which are 64 bits. The frames 1 to 8 are called one batch, which is transmitted as a single unit.

The transmission signal is a tone dialer signal for transmitting data by using dial tones. In FIG. 3B is shown an example of transmission data when the calling number (telephone number of a recipient) is 03-1234-5678 and the message is "アイウエオ." In Japan, it is specified that katakana characters be expressed as combinations of numerals; thus, "ア," "イ," "ウ," "エ," and "オ," are respectively expressed as combinations of two digits such as 11, 12, 13, 14 and 15. In addition, it is specified that *2*2 must be input to mean the start of conversion.

In this embodiment, when a signal is to be transmitted by the tone dialer 8, in response to the manipulation of a switch, the list of calling numbers in the telephone number area 4 is displayed on the display unit 6, and the call number for a recipient is selected by employing the switch 5. At this time, the controller 2 automatically inserts the data PAUSE immediately after the call signal to temporarily halt the transmission of a tone signal, and displays the data on the display unit 6.

Furthermore, in this embodiment, a message to be transmitted is edited by using the switch 5 and is displayed on the display unit 6 following the call number and the data PAUSE.

After the message is edited, the call numbers are read from the telephone number holding area 4 and one is selected. Then, the selected call number, together with the data PAUSE, is inserted before the edited message and displayed.

When the message has been input, a tone dialer switch 9 is depressed while the loudspeaker of the tone dialer 8 is held near the mouth-piece of the telephone. First, the call number is transmitted and then transmission is temporarily halted.

In addition, in this embodiment, when the tone dialer switch 9 is again depressed once the telephone has been connected to the selective call radio system, the message portion can be transmitted.

FIG. 4 is a flowchart for the message transmission process performed by the selective call radio receiver of the present invention. FIGS. 6A to 6D are diagrams showing the contents of the displays on the display unit 6. In FIG. 4, at step 1 (hereinafter referred to simply as "S1"), the telephone number holding area 4 is accessed in response to the manipulation of the switch 5 and the telephone numbers are displayed on the display unit 6, as is shown in FIG. 6A. At S2, a desired telephone number is selected from the telephone numbers displayed on the display unit 6 (03-1234-5678, which is underlined in FIG. 6A). When the telephone number has been selected, the pause signal P (indicated by an arrow in FIG. 6A) is automatically entered (S3).

At S4, the switch 5 is used to edit the message "アイウエオ" in accordance with examples of how to prepare a message shown in FIG. 6B. When the editing is completed, at S5 the tone dialer switch 9 is depressed. At S6 a tone signal for the call number shown in FIG. 6C is transmitted through the loudspeaker of the tone dialer 8, and then the transmission is temporarily halted. At S7, the connection with the selective call radio system is recognized.

When the connection has been confirmed, the temporary transmission halt is released, and at S8 the tone dialer switch 9 is again depressed. As a result, the message shown in FIG. 6D is transmitted as a tone signal through the loudspeaker of the tone dialer 8.

Another embodiment of the present invention will now be explained.

Figure 5:
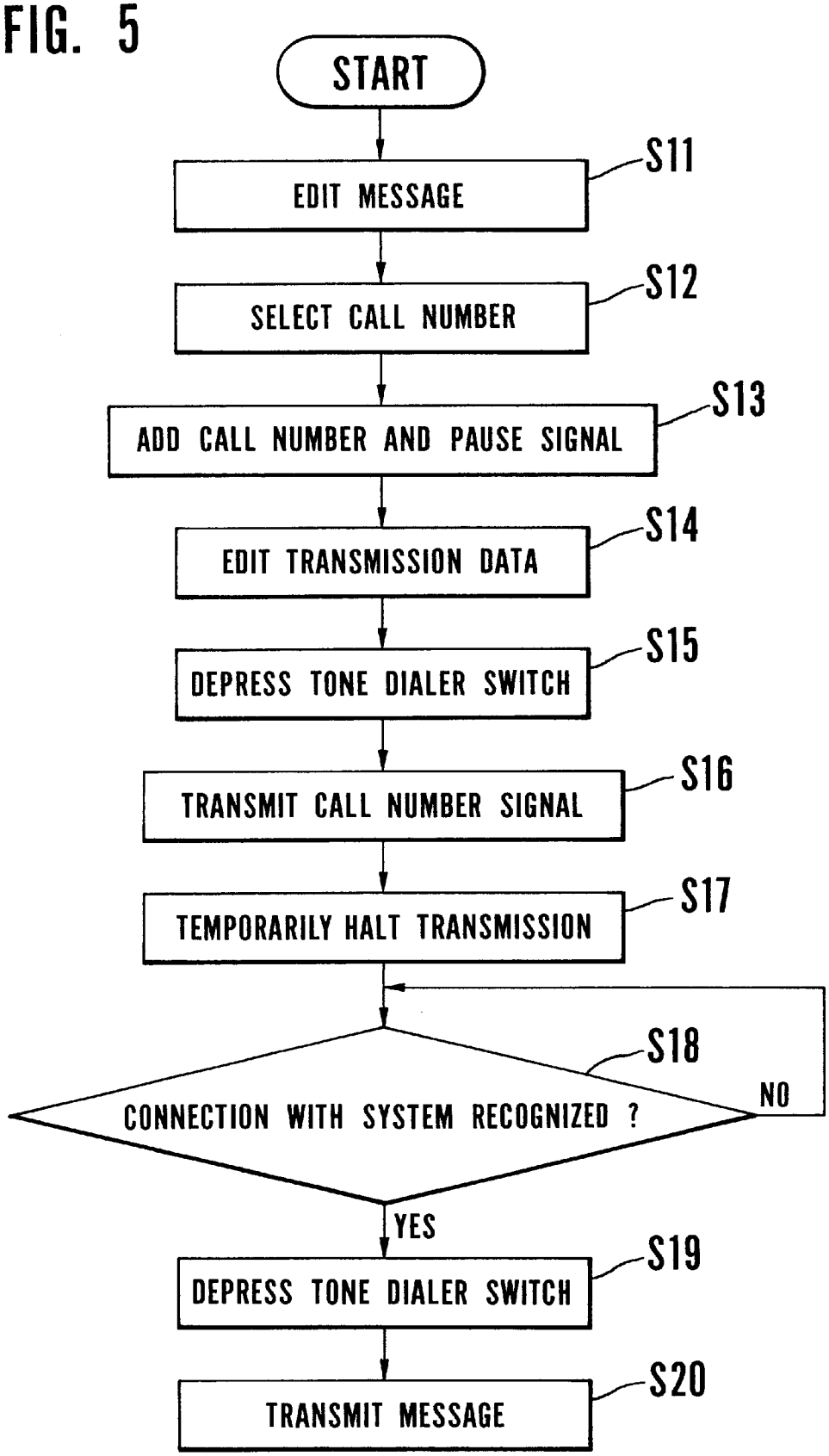
FIG. 5 is a flowchart of a transmission operation for the selective call radio receiver according to another embodiment of the present invention.

FIG. 5 is a flowchart for the process performed in another embodiment of the present invention. Since the configuration in this embodiment is the same as that in the embodiment shown in FIG. 1, only those operations that differ from the ones in the first embodiment will be described in detail, while FIG. 1 is referred to for the arrangement.

In FIG. 5, a person holding the receiver edits a message on a display unit 6 (S11). When the editing has been completed, at step S12 a telephone number holding area 4 is accessed by the manipulation of a switch 5, and a telephone number of a recipient, i.e., a call number, is selected. At S13, the call number and a temporary halt signal PAUSE are positioned at the head of the edited transmission message on the display unit 6. At S14, the message that is to be transmitted is edited.

At S15 a tone dialer switch 9 is depressed, and at S16, first, a tone signal for the call number is transmitted through the loudspeaker for a tone dialer 8, and then the transmission is temporarily halted (S17).

Following this, at S18 a connection with the selective call radio system is recognized. At S19, the tone dialer switch 9 is again depressed, and at S20 the message data is transmitted as a tone signal through the loudspeaker of the tone dialer 8.

As has been described above, according to the selective call radio receiver of the present invention, during the process for selecting, from among telephone numbers stored in advance, a telephone number for the receiver of a recipient of a message, and for transmitting as a tone signal the telephone number selected as a call number accompanied by a message, a pause signal is inserted between a call signal and message before a tone signal is transmitted in order to halt the transmission of the tone signal, so that first the telephone number for the receiver of the recipient of the message can be selected and then the message to be transmitted can be edited. Furthermore, when a message that is be transmitted is edited, and the telephone number for the receiver of the recipient of a message is selected, before transmission of a tone signal, the call number is moved to the head of the transmission data and a pause signal is inserted between the call signal and the message to halt the transmission of the tone signal.

In addition, to output a reception signal, the selective call radio receiver displays the list of telephone numbers stored in the holding area in response to the manipulation of a switch, so that the call number of a recipient can be selected.

As has been described above, according to the above embodiments, when the call number of a recipient and a message are to be transmitted together using a tone dialer, a tone dialer signal is temporarily and automatically halted for the transmission of the call number and the message. As a result, a sender can connect the receiver to the system by manipulating a single button to enable the transmission of a message.

According to the present invention, when the message is prepared and then the call number of a recipient is selected, the call number is always positioned in front of the message, so that a complicated and troublesome operation can be avoided.

As has been described above, according to the present invention, since a temporary halt function is automatically inserted between the calling number of a recipient and a message to be transmitted, only the manipulation of a single switch is required to ensure that a connection is made with a selective call radio system and that a message is transmitted.

Furthermore, according to the present invention, since the call number of a recipient can be selected after a message has been edited, and since the call number selected after the message has been edited is automatically positioned in front of the transmission data, further editing and the setting of the transmission order are not required. And as a result, the usability can be enhanced.

What is claimed is:

1. A selective call radio receiver comprising:
   a data holding area for holding data corresponding to a telephone number of a receiver of a recipient of a message;
   a call number selection element for selecting specific telephone number data from among telephone number data stored in said data holding area;
   a tone dialer for transmitting as a tone signal said specific telephone number, which is selected as a call number by said call number selection element, accompanied by a message; and
   a controller for temporarily halting transmission of a tone signal by automatically inserting a pause signal between said call number and said message.

2. A selective call radio receiver according to claim 1, further comprising a notification unit for notifying a user of said receiver that a call has been received when said controller determines that an address included in received data matches an inherent address.

3. A selective call radio receiver according to claim 1, further comprising a display unit on which a list of telephone numbers for receivers of recipients held in said data holding area are displayed as desired by manipulation of a switch.

4. A selective call radio receiver according to claim 1, further comprising an editing element for editing a message to be transmitted.

5. A data transmission method performed by a selective call radio receiver that selects a telephone number for a receiver of a recipient of a message from among telephone numbers stored in advance, and that transmits as a tone signal said telephone number which is selected as a call signal accompanied by a message, comprising the steps of:
   when said telephone number of said receiver of said recipient for said message is selected and then said message to be transmitted is edited, automatically inserting a pause signal for temporarily halting transmission of a tone signal between said call signal and said message.

6. A data transmission method according to claim 5, wherein, by manipulation of a switch, a list of a plurality of telephone numbers stored in advance is displayed as desired on a display unit to select said telephone number of said receiver of said recipient.

7. A data transmission method for a selective call radio receiver that selects a telephone number for a receiver of a recipient of a message from among telephone numbers stored in advance, and that transmits as a tone signal said telephone number which is selected as a call signal accompanied by a message, comprising the steps of:
   when said telephone number of said receiver of said recipient of said message is selected and then said message to be transmitted is edited, moving said telephone number to the head of data to be transmitted before transmitting said tone signal, and inserting a pause signal for halting transmission of said tone signal between said call number and said message.

8. A selective call radio receiver according to claim 1, wherein said controller further includes a function for moving said telephone number to the head of data to be transmitted before transmitting said tone.

* * * * *